United States Patent Office 3,444,265
Patented May 13, 1969

3,444,265
STABILIZATION OF OXYMETHYLENE COPOLYMERS WITH DIPHENYLAMINE ACETONE CONDENSATION PRODUCTS
Merrill N. O'Brien, Jr., New Providence, and Frank M. Berardinelli, South Orange, N.J., assignors to Celanese Corporation, New York, N.Y., a corporation of Delaware
No Drawing. Filed June 30, 1966, Ser. No. 561,714
Int. Cl. C08g 51/60, 37/04
U.S. Cl. 260—857                                5 Claims

ABSTRACT OF THE DISCLOSURE

Compositions which comprise an oxymethylene copolymer, a thermoplastic linear polycarbonamide and a solid fusible diphenylamine-acetone condensation product are disclosed, the latter two components serving to improve the long-term high temperature stability of the compositions. These compositions are useful for the production of various shaped articles, e.g., tubing, pipes and the like.

---

This invention relates to the stabilization of oxymethylene copolymers and relates more particularly to stabilizing systems for oxymethylene-oxyethylene copolymers of high oxymethylene content.

Polyoxymethylene of high molecular weight is a very strong, tough material that, however, tends to degrade, producing formaldehyde by its decomposition, on heating at elevated temperatures such as 230° C. This material can be stabilized to some extent by the addition of small amounts of phenols or aromatic amines, as illustrated for example in U.S. Patent 2,920,059. The inherent resistance of the polymeric material to degradation on heating can be improved by chemical modification, particularly by copolymerization as illustrated in U.S. Patent 3,027,352 to form oxymethylene copolymers containing minor proportions of interspersed oxyethylene radicals or other radicals resistant to the "unzipping" characteristic of polyoxymethylene; copolymers of this type are also described by Kern et al. in Angewandte Chemie 73(6), pp. 177–186 (Mar. 21, 1961).

In conventional commercial practice, molding compositions made of the oxymethylene copolymer contain also a phenolic stabilizer and a scission inhibitor (such as an amidine). While such compositions have relatively high thermal stability, their heat-resistance is still not entirely satisfactory for long-term high temperature use (e.g. at temperatures on the order of 110° C., such as may be encountered in hot water pipe or certain automobile parts positioned close to a hot internal combustion engine). An indication of the long-term high temperature stability of the product can be obtained on accelerated thermal testing, using a temperature of 230° C. for 15 hours. In such an accelerated test, a typical commercial stabilized oxymethylene copolymer molding material loses about 25–35% of its weight. The acetate-capped homopolymer is less heat-resistant; for a typical commercial stabilized end-capped polyoxymethylene molding material the weight loss under these same conditions is about 60–70%.

It is, therefore, an object of this invention to provide oxymethylene copolymer compositions of improved long-term high temperature stability.

Another object of this invention is the provision of an oxymethylene-oxyethylene copolymer composition of high strength and outstanding thermal stability.

Other objects of this invention will be apparent from the following detailed description and claims. In the description and claims, all proportions are by weight unless otherwise indicated.

In accordance with one aspect of this invention, an oxymethylene-oxyethylene copolymer of high oxymethylene content is stabilized by the incorporation therein of a linear polyamide and a solid fusible diphenylamine-acetone condensation product, preferably having a melting point (by Ball and Ring test) of at least about 50° C.

The linear polyamide is preferably fusible polymer having carbonamide groups as an integral part of the linear polymeric chain and having a molecular weight of above 1000 and most preferably a thermoplastic nylon having a melting point above 140° C. (e.g. in the range of 150–200° C.). Especially good results have been obtained with a nylon which is an interpolymer of caprolactam, a diamine and a dicarboxylic acid, such as a nylon 6,6/nylon 6,10/nylon 6 terpolyamide, made from caprolactam, hexamethylene diamine, adipic acid and sebacic acid, and containing, for example, 38% of

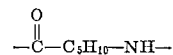

units, 31% of —HNC$_6$H$_{12}$NH— units, 17½% of —OCC$_4$H$_8$CO— units, and 13½% of —OCC$_8$H$_{16}$CO— units, and having a melting point of about 150–160° C. It is within the broader scope of this invention to use other thermoplastic linear polyamides, including polyamides of aminocarboxylic acids or of dicarboxylic acid-diamine combinations, e.g. poly(11-undecanoamide) or poly N,N' - diisobutylhexamethylene sebacamide, and spiro polyamides such as polyamide acetals, e.g. having a repeating unit of the formula:

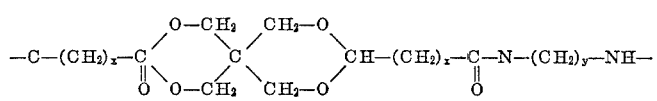

where $x$ and $y$ are small numbers (e.g. 4). The proportion of polyamide is preferably small, for example well below 10%, usually well below 5%. Amounts less than 2% e.g. within the range of about ⅒ to 1% have been employed with good results.

Methods of manufacturing the fusible diphenylamine acetone condensation products are well known in the art, as shown in U.S. Patents 1,807,355 and 2,002,642. The proportions of this ingredient are likewise preferably small, for example well below 10%, usually well below 5%. Amounts less than 2%, e.g. within the range of about 1/10 to 1% have been employed with good results. The use of liquefying ingredients, e.g. volatile solvents or plasticizers, in admixture with the solid, fusible diphenylamine-acetone condensation products is within the scope of the invention.

The invention finds its greatest utility in the stabilization of oxymethylene-oxyalkylene copolymers (and particularly oxymethylene-oxyethylene copolymers) such as disclosed in Walling et al., U.S. Patent 3,027,352, including terpolymers with minor amounts of polyfunctional compounds such as disclosed in French Patent 1,345,218 (South African Patent 62/4771). The copolymer may be pre-treated as described in U.S. Patent 3,219,623 to remove less stable terminal oxymethylene groups or a copolymer containing such less stable groups may be made more stable by milling or otherwise mechanically working it with the polyamide and diphenylamine-acetone condensation product at a relatively high temperature (preferably above the melting point of the polymer, e.g. in the range of about 180° to about 220° C.). It is within the broader scope of this invention to employ other oxymethylene copolymers having at least 60% (and preferably at least 95%) oxymethylene groups and containing other interspersed —O—R— units, where R is a divalent radical containing at least two carbon atoms directly linked to each other and positioned in the chain between the two valences, the substituents, if any, on said R radical being preferably inert. Various types of —O—R— units have been described in the art, including those in the previously mentioned Kern et al. article, —O—R— units derived from monomers having carbon-to-carbon unsaturation (e.g. acrylamide), and —O—R— units in which the R is a source of chain branching.

Preferably, the oxymethylene copolymer has a melting point of at least 150° C. and is normally millable at a temperature of 200° C. Its inherent viscosity (measured at 60° C. in a 0.1% solution in a p-chlorophenol containing 2% α-pinene) is preferably at least one, and it is preferably resistant to alkaline hydrolysis (e.g. resistant to exposure to 50% aqueous NaOH solution under reflux at 140–145° C. for one hour).

The polyamide and the diphenylamine-acetone condensation product may be blended with the oxymethylene polymer in any desired manner, as by dry blending the polymer and these stabilizers, all in finely divided condition, and milling the stabilizers into the polymer as the latter is worked on a rubber mill or other mixing equipment at a temperature (e.g. in the range of about 170–200° C., depending on the type of polymer) at which the polymer is plastic. In another less preferred method the stabilizers are applied, in solution in a suitable solvent, to the finely divided solid oxymethylene polymer followed by evaporation of the solvent. To produce a "molding powder" from the stabilizer-containing composition it may be extruded (at an elevated temperature, e.g. in the range of about 180 to 220° C.) to form continuous rods, preferably cylindrical in cross-section and of small diameter (e.g. 1/16–1/8 inch) and the rods cut transversely to form pellets (e.g. small cylinders about 1/8–1/4 inch long and about 1/16–1/8 inch in diameter).

The following examples are given to illustrate the invention further.

Example 1

(a) A random copolymer of trioxane and ethylene oxide prepared with a boron trifluoride catalyst and containing about 2% of interspersed oxyethylene groups was treated to remove unstable oxymethylene groups at the ends of the polymer chains, as disclosed in U.S. Patent 3,219,623, and was blended with 0.5% of its weight of "Aminox" (a diphenylamineacetone reaction product), which is a light tan-green powder having a melting range of 85–96° C. (Ball and Ring test), a specific gravity of 1.15, soluble in acetone and ethylene dichloride, slightly soluble in benzol and insoluble in water and gasoline, and 0.5% of the nylon 6,6/nylon/6,10/nylon 6 terpolyamide previously described ("Zytel 61") (which nylon was soluble in methyl, ethyl and propyl alcohols and had a specific gravity of 1.13), by agitating the polymer, in finely divided flake form, with the finely divided stabilizers and then working the mixture on a "Plastograph" at 200° C. for 7–10 minutes. (A Plastograph is a device in which the mechanical working is effected in a heated chamber with counter-rotating blade mixers.) The resulting blend was compression-molded at 190° C. to form 5 gram discs about 2 inches in diameter, which were then tested for thermal stability by maintaining them at a temperature of 230° C. in air (in a recess in a constant temperature block having a lid permitting restricted access of the outside atmosphere) and measuring the weight lost by the specimens. After 15 hours of test, the weight loss was 7.7%. On testing the discs of this Example 1 for 1500 hours at 150° C. (a temperature at which the discs remained solid), the weight loss was 3%.

(b) When the polyamide was omitted, the product had a weight loss, after 15 hours at 230° C., of about 25%.

(c) When the same proportion of the "Aminox" (i.e. ½%) was incorporated into a commercial stabilized polyoxymethylene homopolymer end-capped with acetate end groups and containing minor amounts of a polyamide stabilizer of the type described above and a phenolic stabilizer ("Delrin 550"), the effect of the incorporation of the "Aminox" was to decrease the thermal stability of the product. Both the commercial homopolymer and the mixture thereof with "Aminox" were too unstable for a measurement (with the apparatus available) of their weight losses at 230° C. for 15 hours; the test samples frothed over. However, after only 45 minutes at 230° C., the weight loss for the commercial stabilized homopolymer was 1.14%, while the weight loss for the mixture of commercial stabilized homopolymer and "Aminox" was 1.71%, indicating that the Aminox raised the degradation rate by 50%.

The compositions of this invention are useful for the production of shaped articles, e.g. by injection molding, compression-molding, blow-molding, extrusion, etc., and are particularly useful for the manufacture of articles requiring a long, heat-resistant life, such as tubing, pipe and automotive under-the-hood parts.

It is to be understood that the foregoing detailed description is given merely by way of illustration and that many variations may be made therein without departing from the spirit of the invention.

The embodiments of the invention in which an exclusive property or privilege is claimed are defined as follows:

1. A composition of matter consisting essentially of an oxymethylene-oxyalkylene copolymer resin, having a melting point above about 150° C. and having a chain containing at least about 60% of recurring oxymethylene groups interspersed with —OR— groups in said chain, where R is a divalent radical containing at least two carbon atoms directly linked to each other and positioned in the chain between the two valences, any substituents on said R radical being inert, said composition containing from about 0.1 to about 10 weight percent of a thermoplastic linear polycarbonamide stabilizer for said resin, said polycarbonamide having carbonamide groups as an integral part of the linear polymer chain and having a molecular weight of above 1000, and from about 0.1 to about 10 weight percent of a fusible diphenylamine-acetone condensation product.

2. A composition as in claim 1 in which said oxymethylene polymer is resistant to alkaline hydrolysis.

3. A composition of matter as set forth in claim 1 in which the proportion of amide stabilizer is in the range of about 1/10 to 5% and the proportion of said condensation product is in the range of about 1/10 to 5%.

4. A composition of matter as in claim 1 in which said polycarbonamide is a copolyamide of caprolactam, a diamine and a dicarboxylic acid.

5. A composition as in claim 4 in which said polycarbonamide contains

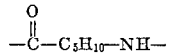

—HNC$_6$H$_{12}$—NH— units, —OCC$_4$H$_8$CO— units, and —OCC$_8$H$_{16}$CO— units, and has a melting point of about 150 to 160° C.

References Cited

FOREIGN PATENTS

| 655,271 | 1/1965 | Belgium. |
| 932,066 | 7/1963 | Great Britain. |
| 1,034,164 | 6/1966 | Great Britain. |

SAMUEL H. BLECH, *Primary Examiner.*

PAUL LIEBERMAN, *Assistant Examiner.*

U.S. Cl. X.R.

260—45.9, 67

PO-1050
(5/69)

UNITED STATES PATENT OFFICE
CERTIFICATE OF CORRECTION

Patent No. 3444265  Dated May 13, 1969

Inventor(s) Merrill N. O'Brien, Jr. and Frank M. Berardinelli

It is certified that error appears in the above-identified patent and that said Letters Patent are hereby corrected as shown below:

In the specification, Column 4 line 3, the temperature range reading "85-96°C." should read -- 85-95°C. --. Claim 5, line 3 thereof, after the chemical structure

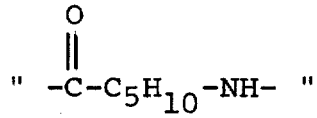

insert -- units, --.

SIGNED AND
SEALED

SEP 2 - 1969

(SEAL)
Attest:

Edward M. Fletcher,
Attesting Officer

WILLIAM E. SCHUYLER, JR.
Commissioner of Patents